(12) United States Patent
Sung (10) Patent No.: US 10,752,275 B1
(45) Date of Patent: Aug. 25, 2020

(54) PANEL CART

(71) Applicant: Meng-I Sung, Feng Yuan Dist., Taichung (TW)

(72) Inventor: Meng-I Sung, Taichung (TW)

( * ) Notice: Subject to any disclaimer, the term of this patent is extended or adjusted under 35 U.S.C. 154(b) by 0 days.

(21) Appl. No.: 16/382,321

(22) Filed: Apr. 12, 2019

(51) Int. Cl.
| *B62B 3/08* | (2006.01) |
| *B62B 3/02* | (2006.01) |
| *B62B 5/04* | (2006.01) |
| *B62B 3/10* | (2006.01) |
| *B62B 5/06* | (2006.01) |

(52) U.S. Cl.
CPC ............... *B62B 3/08* (2013.01); *B62B 3/02* (2013.01); *B62B 3/108* (2013.01); *B62B 5/04* (2013.01); *B62B 5/067* (2013.01); *B62B 2203/07* (2013.01)

(58) Field of Classification Search
CPC ..... B62B 3/02; B62B 3/04; B62B 3/08; B62B 3/108
See application file for complete search history.

(56) References Cited

U.S. PATENT DOCUMENTS

| 2,465,206 | A | * | 3/1949 | Davis | E04F 21/1822 |
| | | | | | 414/11 |
| 2,815,132 | A | * | 12/1957 | Stone | B62B 3/108 |
| | | | | | 414/11 |
| 3,643,935 | A | * | 2/1972 | Bell | B25H 1/00 |
| | | | | | 269/16 |
| 3,765,550 | A | * | 10/1973 | Tausheck | B62B 3/108 |
| | | | | | 414/541 |
| 4,339,219 | A | * | 7/1982 | Lay | E04F 21/1822 |
| | | | | | 254/4 C |
| 4,600,348 | A | * | 7/1986 | Pettit | E04F 21/1822 |
| | | | | | 254/3 C |
| 5,257,799 | A | * | 11/1993 | Cone | B62B 5/04 |
| | | | | | 280/47.36 |
| 5,460,469 | A | * | 10/1995 | Young | B66O 23/48 |
| | | | | | 254/4 C |
| 5,577,744 | A | * | 11/1996 | Parks | B62B 3/02 |
| | | | | | 280/32.6 |
| 6,152,465 | A | * | 11/2000 | Shieh | B62B 1/042 |
| | | | | | 280/62 |
| 7,004,483 | B1 | * | 2/2006 | McEntee | B60P 3/002 |
| | | | | | 280/47.35 |
| 7,997,845 | B2 | * | 8/2011 | Carlei | B65G 49/061 |
| | | | | | 414/10 |
| 8,348,287 | B1 | * | 1/2013 | Smith | B62B 3/04 |
| | | | | | 280/47.34 |
| 9,381,930 | B2 | * | 7/2016 | Septimio | B62B 3/02 |

(Continued)

*Primary Examiner* — Erez Gurari
(74) *Attorney, Agent, or Firm* — Alan D. Kamrath; Karin L. Williams; Mayer & Williams PC (57) ABSTRACT

A panel cart includes a base frame and a supporting frame. The base frame includes a positioning seat. The positioning seat includes an outer surface having a sliding portion and an engaging slot contiguous to the sliding portion. A supporting frame is pivotably mounted to the base frame and pivotable between a folding position and an extended position about a pivotal axis. The supporting frame includes a locking seat and a locking member slidably mounted to the locking seat. The locking member remains in contact with the positioning seat. The locking member abuts against the sliding portion when the supporting frame is in the folding position. The locking member engages with the engaging groove when the supporting frame is in the extended position.

4 Claims, 8 Drawing Sheets

(56) References Cited

U.S. PATENT DOCUMENTS

| | | | |
|---|---|---|---|
| 2005/0036871 A1* | 2/2005 | Jackson | B62B 3/08 |
| | | | 414/619 |
| 2007/0235968 A1* | 10/2007 | Krizan | B62B 3/108 |
| | | | 280/79.7 |
| 2013/0087994 A1* | 4/2013 | Pratt | B62B 3/02 |
| | | | 280/651 |
| 2013/0113185 A1* | 5/2013 | Zehfuss | B62B 7/062 |
| | | | 280/647 |
| 2013/0234420 A1* | 9/2013 | Reimers | B62B 5/085 |
| | | | 280/651 |
| 2018/0346009 A1* | 12/2018 | Mendoza | B62B 5/067 |

* cited by examiner

PANEL CART

BACKGROUND OF THE INVENTION

The present invention relates to a cart and, more particularly, to a panel cart.

During processing, panels are generally placed flatly on a processing machine or a working table for cutting. In an example, a wooden panel is placed flatly on a working table and is then moved relative to the working table which uses a circular saw to cut the wooden panel. During transportation, panels are placed flatly on a rear portion of a vehicle. However, when the panels are moved from the vehicle onto a working table by manpower, at least two persons are required for the laborsome work. When a cart is used to transport the panels, the panels cannot be placed flatly. Instead, the panels are placed vertically during transportation. A person cannot easily turn the panels having a relatively large area. Furthermore, the vehicle and the cart have a difference in height, which causes difficulties in moving the panels from the vehicle to the cart by a single person. Furthermore, after the cart has reached a side of the working table, a single person cannot easily move the panels onto the working table, and lifting of the panels is inevitable.

Thus, a need exists for a novel panel cart that mitigates and/or obviates the above drawbacks.

BRIEF SUMMARY OF THE INVENTION

A panel cart according to the present invention includes a base frame and a supporting frame. The base frame includes a positioning seat. The positioning seat includes an outer surface having a sliding portion and an engaging slot contiguous to the sliding portion. A supporting frame is pivotably mounted to the base frame and pivotable between a folding position and an extended position about a pivotal axis. The supporting frame includes a locking seat and a locking member slidably mounted to the locking seat. The locking member remains in contact with the positioning seat. The locking member abuts against the sliding portion when the supporting frame is in the folding position. The locking member engages with the engaging groove when the supporting frame is in the extended position.

In an example, the positioning seat is in the form of a board and is located adjacent to a pivotal connection between the base frame and the supporting frame. The sliding portion and the engaging groove are located on a periphery of the positioning seat opposite to the pivotal connection between the base frame and the supporting frame. The locking seat includes an outer tube. The locking member is slidable relative to the locking seat in a direction parallel to a radial direction which is perpendicular to the pivotal axis.

In an example, the locking member includes an engaging head at an end thereof adjacent to the positioning seat. The locking member includes a pull handle at another end thereof opposite to the engaging head. The engaging head and the pull handle extend beyond two opposite ends of the outer tube, respectively. A wider portion and a narrower portion are disposed between the engaging head and the pull handle. The narrower portion has a width smaller than a width of the wider portion. The wider portion is adjacent to the engaging head. The narrower portion is adjacent to the pull handle. The locking seat further includes an inner tube, an elastic element, and a stopper. The inner tube is mounted around the locking member and is received in the outer sleeve. The elastic element is mounted around the narrower portion. The stopper is coupled to the outer tube and the inner tube. The elastic element includes a first end abutting an end face of the wider portion adjacent to the narrower portion and a second end abutting the stopper.

In an example, the base frame includes a first bottom beam, a first vertical beam, and a first supporting beam. Two first casters are mounted to two opposite ends of the first bottom beam. A first end of the first vertical beam is connected to the first bottom beam. An end of the first supporting beam is connected between the first end and a second end of the first vertical beam. The basis frame further includes a second bottom beam, a second vertical beam, and a second supporting beam. The second bottom beam is parallel to the first bottom beam. Two second casters are mounted to two opposite ends of the second bottom beam. The second vertical beam is parallel to the first vertical beam. A first end of the second vertical beam is connected to the second bottom beam. The second vertical beam is parallel to the first vertical beam. An end of the second supporting beam is connected between the first end and a second end of the second vertical beam. The base frame further includes a first connecting beam and a second connecting beam. The first connecting beam includes a first end connected to the first bottom beam and a second end connected to the second bottom beam. The second connecting beam includes a first end connected to the first vertical beam and a second end connected to the second vertical beam. The positioning seat is mounted to the second vertical beam and is adjacent to the second end of the second vertical beam opposite to the second bottom beam. The supporting frame includes a first supporting rod, a second supporting rod, and a third supporting rod. The first supporting rod is parallel to the second supporting rod. A pivotal seat is mounted to the first supporting rod and is pivotably connected to the first vertical rod. The locking seat is mounted to the second supporting rod and is pivotably connected to the second vertical beam. Two ends of the third supporting rod are connected to an end of the first supporting rod and an end of the second supporting rod, respectively. Two brackets are mounted to the third supporting rod. When the supporting frame is in the folding position, the two brackets are adjacent to the first bottom beam and the second bottom beam. When the supporting frame is in the extended position, the two brackets are elevated, and the first supporting rod and the second supporting rod are in a horizontal position.

In an example, the supporting frame includes a push handle which is substantially U-shaped. An end of the push handle is slidably received in another end of the first supporting rod opposite to the third supporting rod. Another end of the push handle is slidably received in another end of the second supporting rod opposite to the third supporting rod.

In an example, the sliding portion is arcuate.

The present invention will become clearer in light of the following detailed description of illustrative embodiments of this invention described in connection with the drawings.

DETAILED DESCRIPTION OF THE INVENTION

Figure 1:
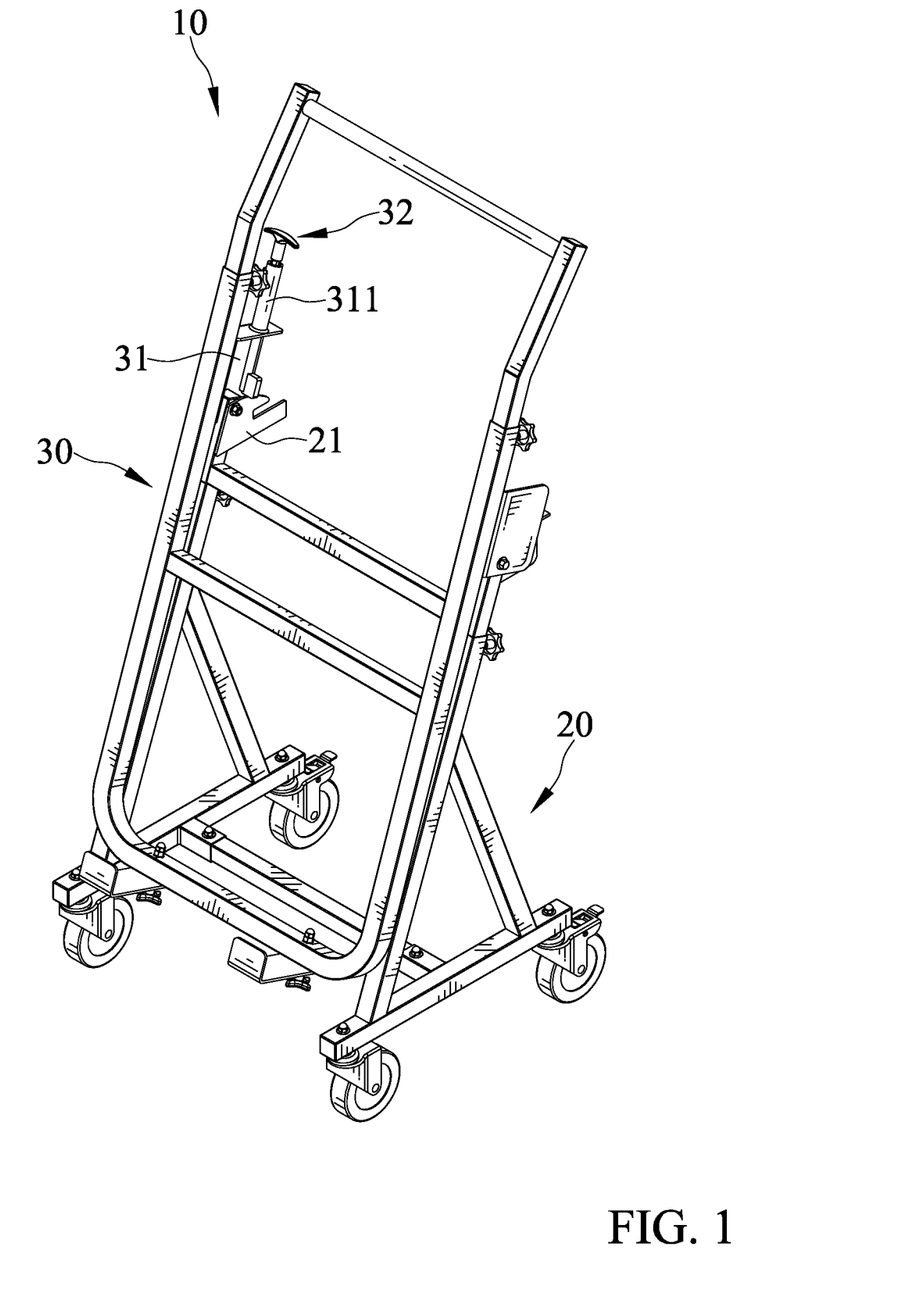
FIG. 1 is a perspective view of a panel cart of an embodiment according to the present invention.
Figure 2:
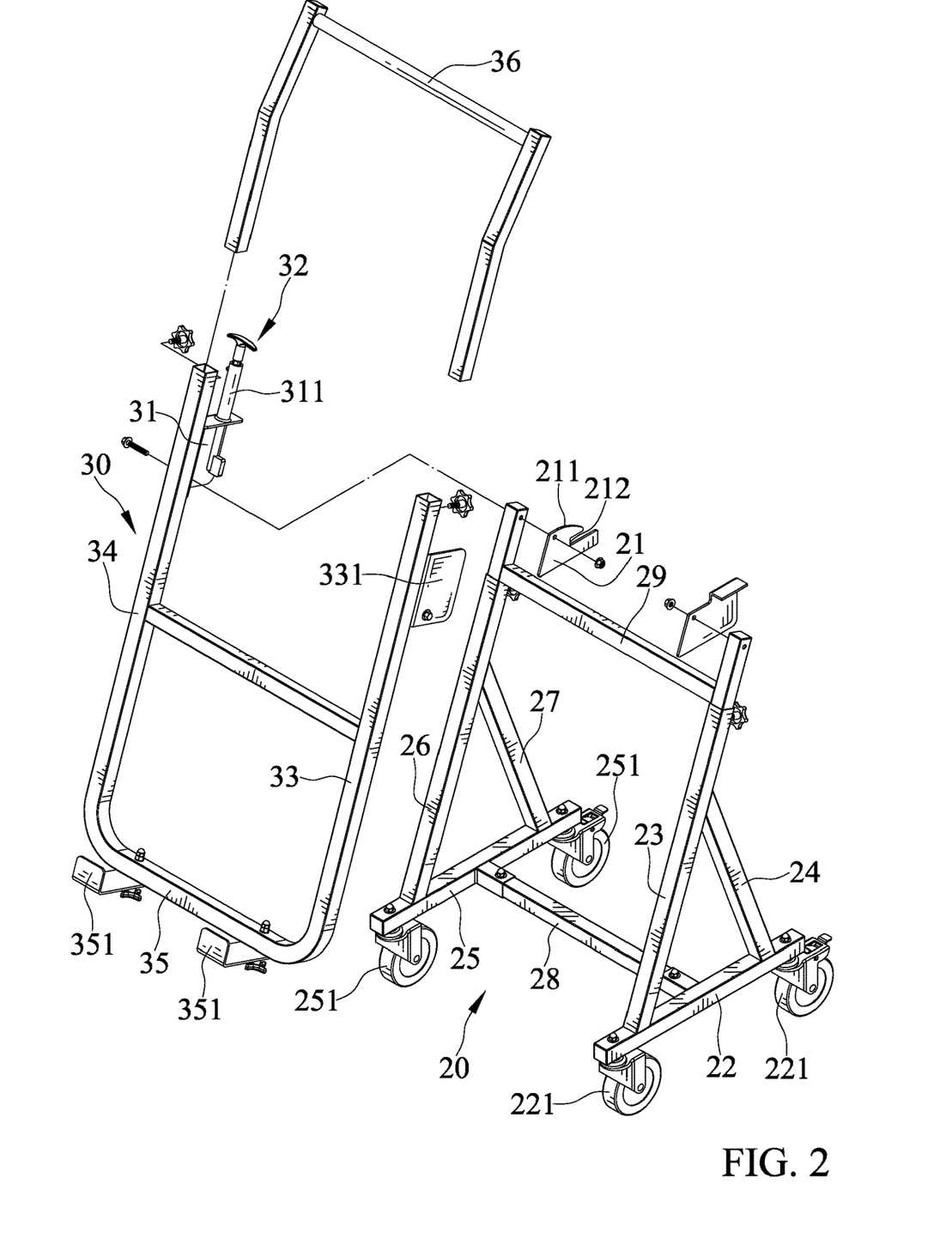
FIG. 2 is an exploded, perspective view of the panel cart of FIG. 1.
Figure 3:
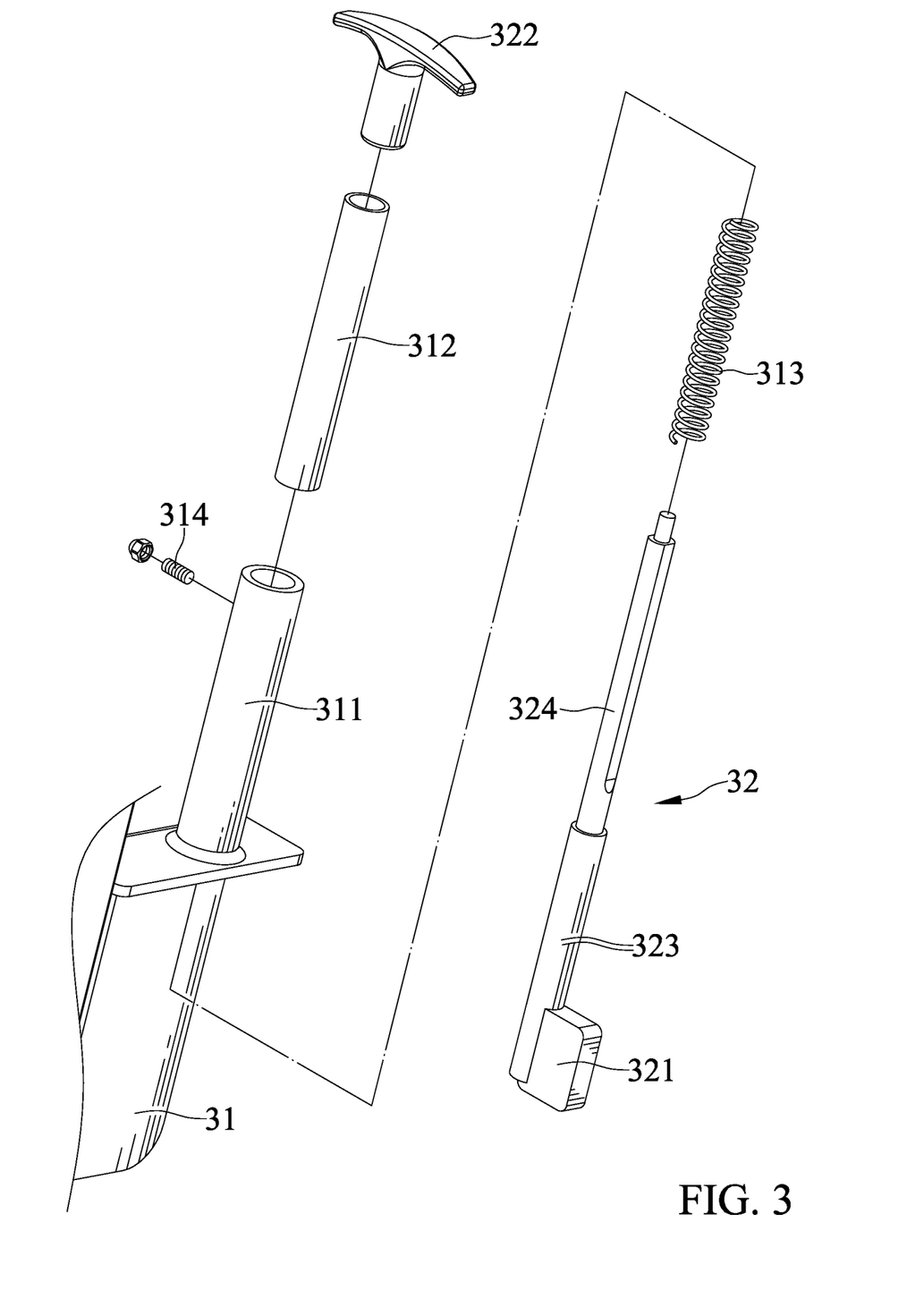
FIG. 3 is an exploded, perspective view of a locking seat and a locking member of the panel cart of FIG. 1.

With reference to FIGS. 1-3, a panel cart 10 of an embodiment according to the present invention includes a base frame 20 and a supporting frame 30. The base frame 20 includes a positioning seat 21. The positioning seat 21 includes an outer surface having a sliding portion 211 and an engaging slot 212 contiguous to the sliding portion 211. The sliding portion 211 is arcuate.

The base frame 20 includes a first bottom beam 22, a first vertical beam 23, and a first supporting beam 24. Two first casters 221 are mounted to two opposite ends of the first bottom beam 22. A first end of the first vertical beam 23 is connected to the first bottom beam 22. An end of the first supporting beam 24 is connected between the first end and a second end of the first vertical beam 23. The basis frame 20 further includes a second bottom beam 25, a second vertical beam 26, and a second supporting beam 27. The second bottom beam 25 is parallel to the first bottom beam 22. Two second casters 251 are mounted to two opposite ends of the second bottom beam 25. The second vertical beam 26 is parallel to the first vertical beam 23. A first end of the second vertical beam 26 is connected to the second bottom beam 25. The second vertical beam 27 is parallel to the first vertical beam 24. An end of the second supporting beam 27 is connected between the first end and a second end of the second vertical beam 26. The base frame 20 further includes a first connecting beam 28 and a second connecting beam 29. The first connecting beam 28 includes a first end connected to the first bottom beam 22 and a second end connected to the second bottom beam 25. The second connecting beam 29 includes a first end connected to the first vertical beam 23 and a second end connected to the second vertical beam 26. The positioning seat 21 is mounted to the second vertical beam 26 and is adjacent to the second end of the second vertical beam 26 opposite to the second bottom beam 25.

With reference to FIGS. 4-8, the supporting frame 30 is pivotably mounted to the base frame 20 and is pivotable between a folding position and an extended position about a pivotal axis. The supporting frame 30 includes a locking seat 31 and a locking member 32 slidably mounted to the locking seat 31. The locking member 32 remains in contact with the positioning seat 21. The locking member 32 abuts against the sliding portion 211 when the supporting frame 30 is in the folding position. The locking member 32 engages with the engaging groove 212 when the supporting frame 30 is in the extended position.

The positioning seat 21 is in the form of a board and is located adjacent to a pivotal connection between the base frame 20 and the supporting frame 30. The sliding portion 211 and the engaging groove 212 are located on a periphery of the positioning seat 21 opposite to the pivotal connection between the base frame 20 and the supporting frame 30. The locking seat 31 includes an outer tube 311. The locking member 32 is slidable relative to the locking seat 31 in a direction parallel to a radial direction which is perpendicular to the pivotal axis.

Figure 5:
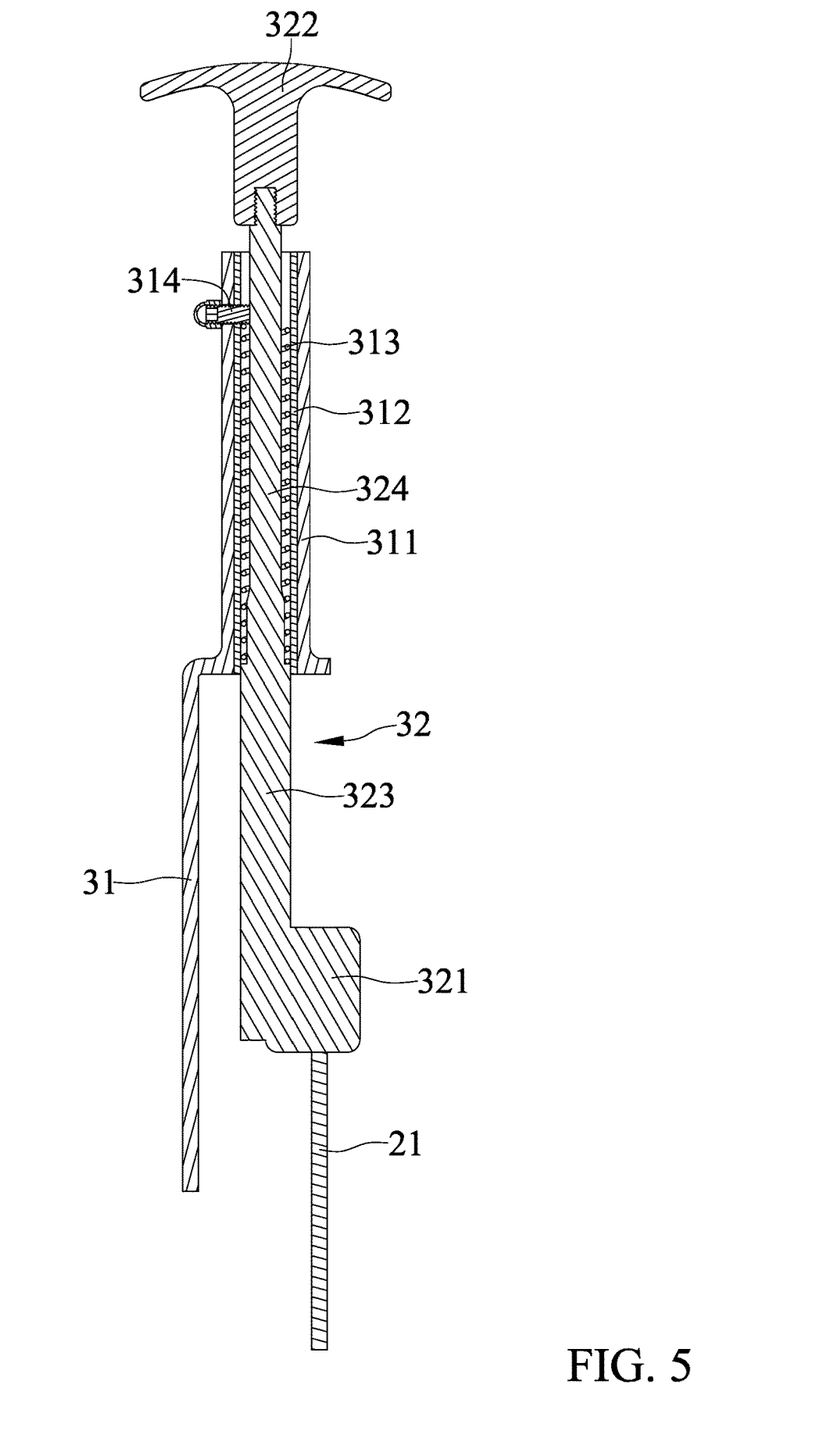
FIG. 5 is a cross sectional view of a locking member of the panel cart in the folding position.
Figure 6:
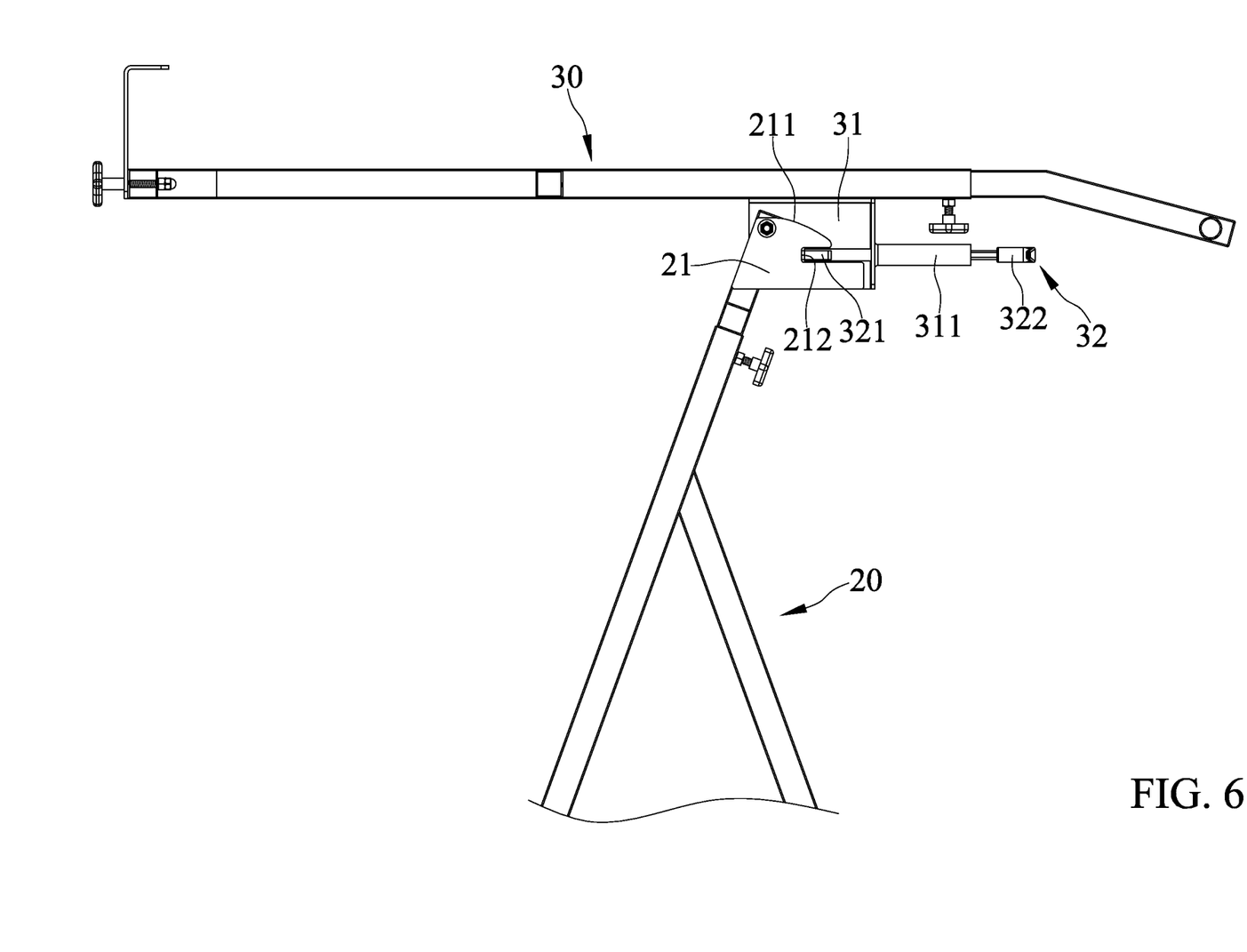
FIG. 6 is a partial, side view of the panel cart in an extended position.
Figure 7:
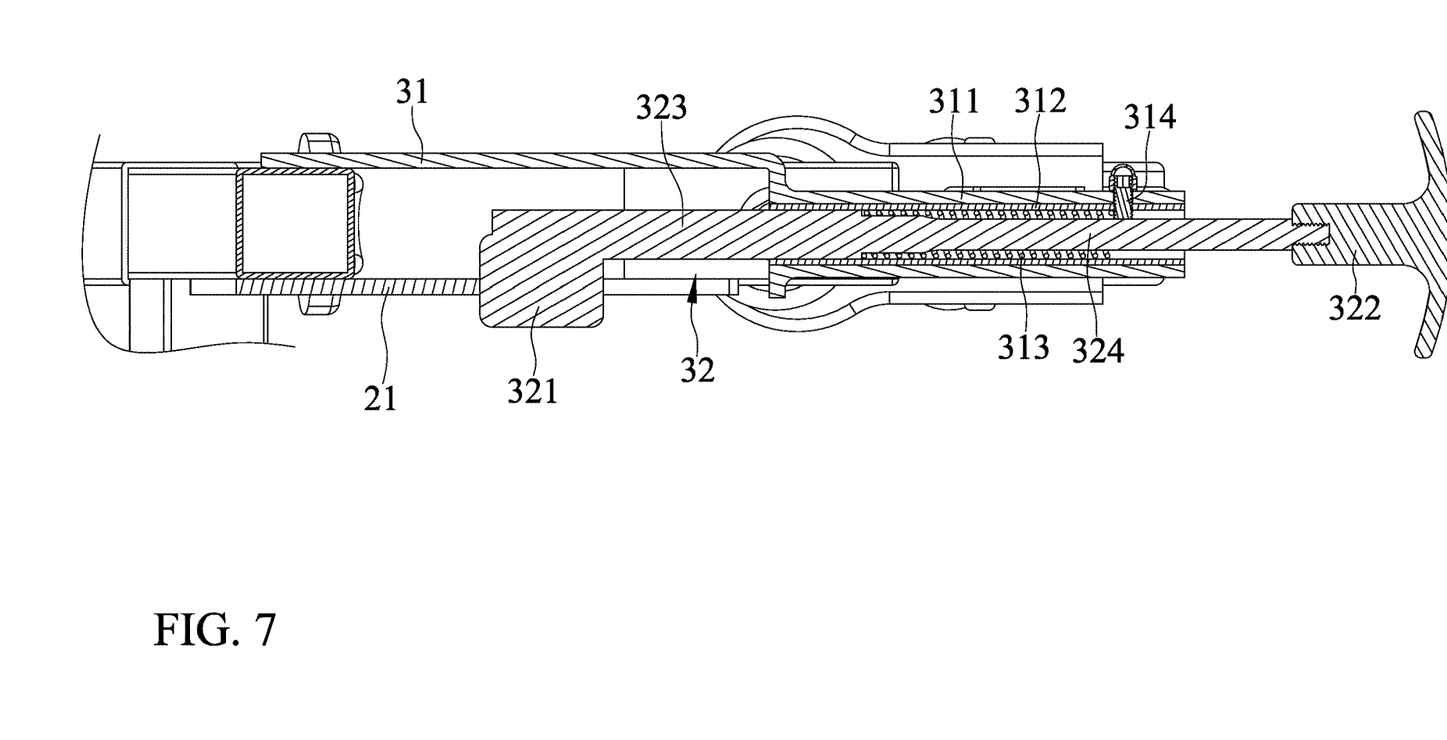
FIG. 7 is a partial, cross sectional view of the panel cart in the extended position.

The locking member 32 includes an engaging head 321 at an end thereof adjacent to the positioning seat 21. The locking member 32 includes a pull handle 322 at another end thereof opposite to the engaging head 321. The engaging head 321 and the pull handle 322 extend beyond two opposite ends of the outer tube 311, respectively. A wider portion 323 and a narrower portion 324 are disposed between the engaging head 321 and the pull handle 322. The narrower portion 324 has a width smaller than a width of the wider portion 323. The wider portion 323 is adjacent to the engaging head 321. The narrower portion 324 is adjacent to the pull handle 322. The locking seat 31 further includes an inner tube 312, an elastic element 313, and a stopper 314. The inner tube 312 is mounted around the locking member 32 and is received in the outer sleeve 311. The elastic element 313 is mounted around the narrower portion 324. The stopper 314 is coupled to the outer tube 311 and the inner tube 312. The elastic element 313 includes a first end abutting an end face of the wider portion 323 adjacent to the narrower portion 324 and a second end abutting the stopper 314.

Figure 4:
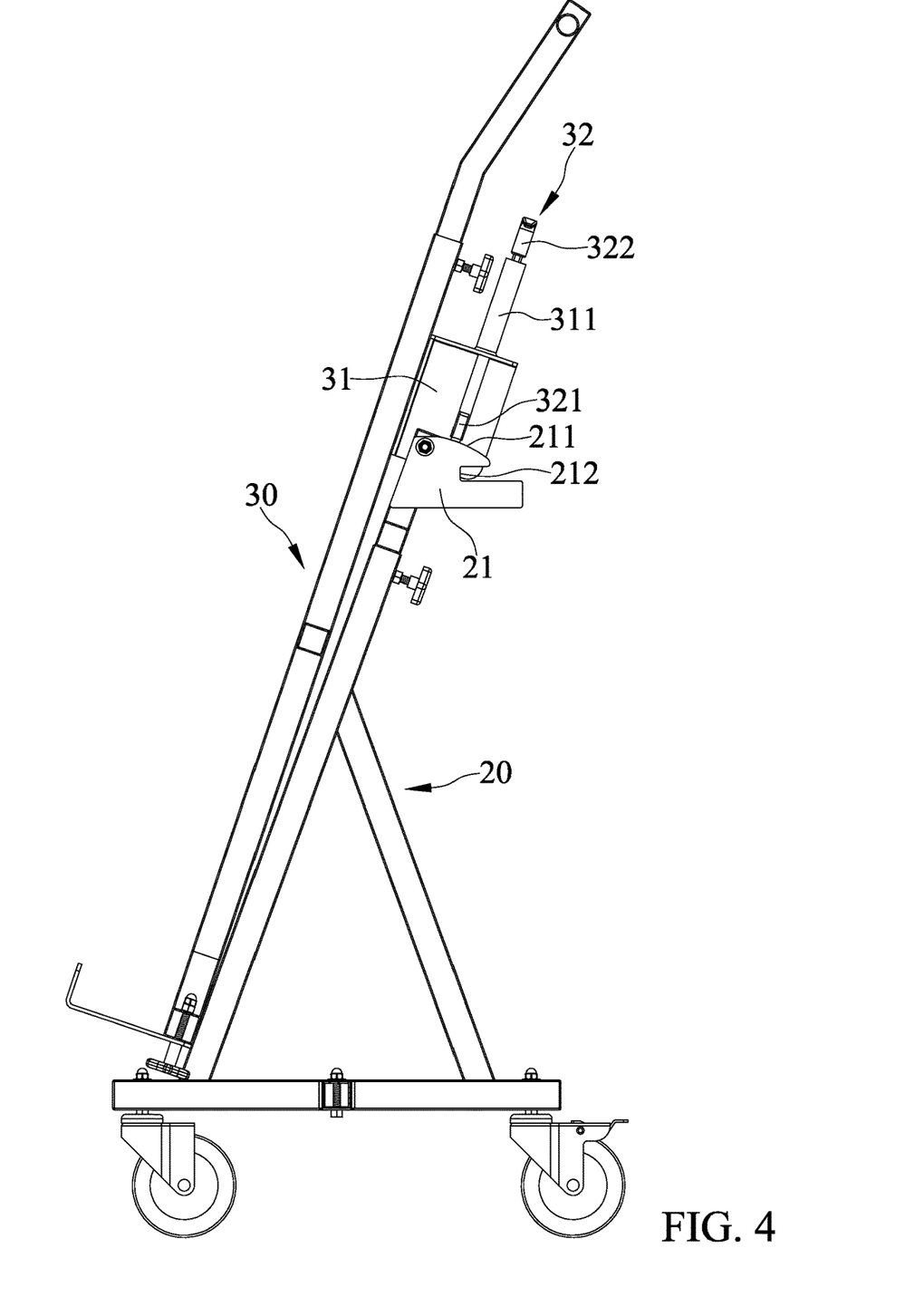
FIG. 4 is a side view of the panel cart in a folding position.
Figure 8:
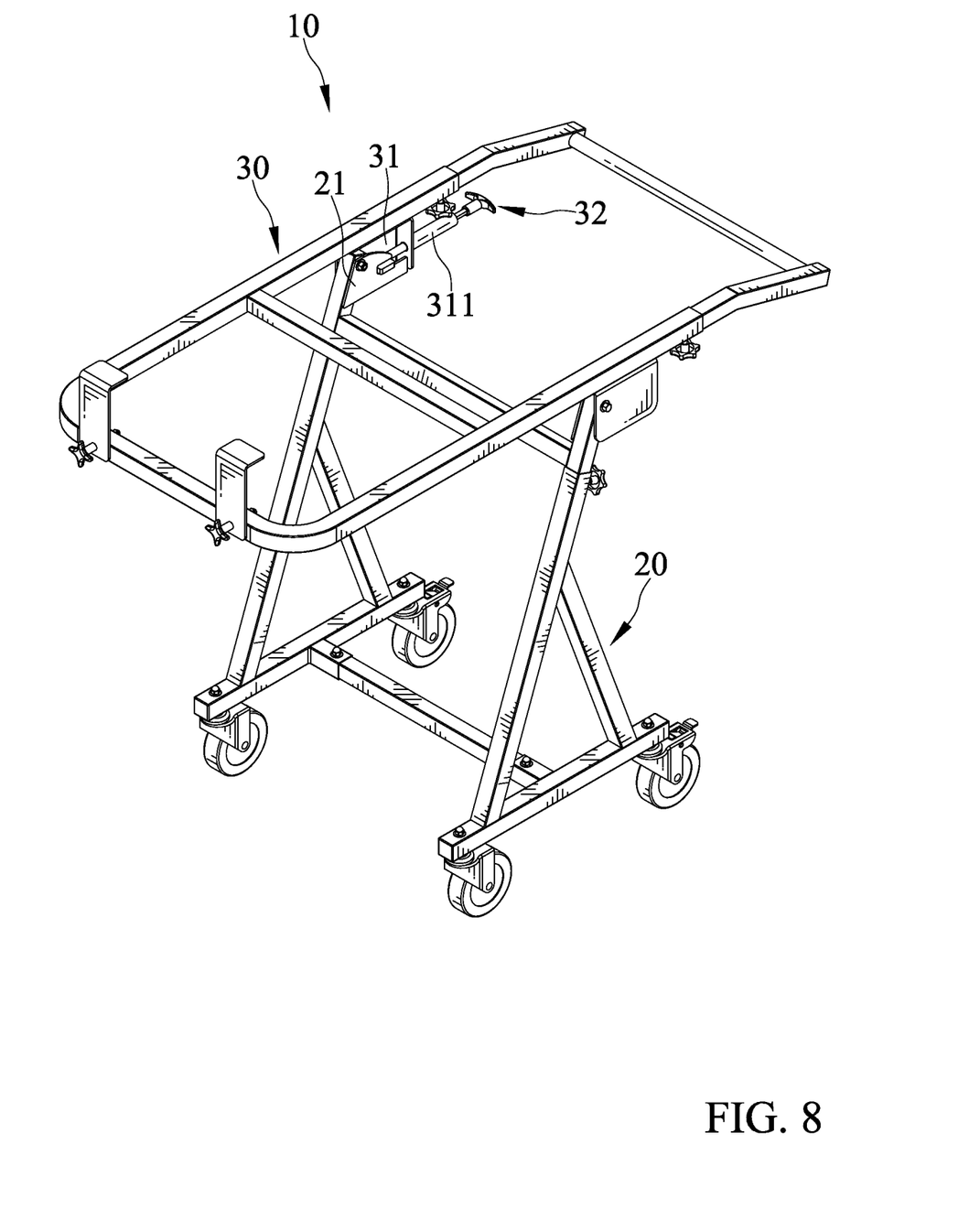
FIG. 8 is a perspective view of the panel cart in the extended position.

The supporting frame 30 includes a first supporting rod 33, a second supporting rod 34, and a third supporting rod 35. The first supporting rod 33 is parallel to the second supporting rod 34. Moreover, the first, second, and third rods 33, 34, and 35 may be integrally connected each other to be formed as a one-piece U-shaped structure. A pivotal seat 331 is mounted to the first supporting rod 33 and is pivotably connected to the first vertical rod 23. The locking seat 31 is mounted to the second supporting rod 34 and is pivotably connected to the second vertical beam 26. Two ends of the third supporting rod 35 are connected to an end of the first supporting rod 33 and an end of the second supporting rod 34, respectively. Two brackets 351 are mounted to the third supporting rod 35. When the supporting frame 30 is in the folding position, the two brackets 351 are adjacent to the first bottom beam 22 and the second bottom beam 25. When the supporting frame 30 is in the extended position, the two brackets 351 are elevated, and the first supporting rod 33 and the second supporting rod 34 are in a horizontal position.

The supporting frame 30 includes a push handle 36 which is substantially U-shaped. An end of the push handle 36 is slidably received in another end of the first supporting rod 33 opposite to the third supporting rod 35. Another end of the push handle 36 is slidably received in another end of the second supporting rod 34 opposite to the third supporting rod 35.

By using the panel cart 10 with the above structure to transport panels, the panels can be easily placed on the panel cart 10 and can be moved onto a working table. When using the panel cart 10 to transport the panels, the supporting frame 30 can be moved to the extended position, such that the panels can be moved onto the panel cart 10 in a horizontal status. Then, the supporting frame 30 is pivoted to the folding position, which permits the panel cart 10 to be easily pushed to a position near the working table. Next, the supporting frame 30 is pivoted back to the extended position, permitting the panel cart 10 to be directly pushed onto the working table. The whole procedure can be easily attained with the assistance of the panel cart 10, which not only reduces the burden of the operators but also reduces the number of people conducting the operation.

Although specific embodiments have been illustrated and described, numerous modifications and variations are still possible without departing from the scope of the invention. The scope of the invention is limited by the accompanying claims

The invention claimed is:

1. A panel cart, comprising:
a base frame including a positioning seat, wherein the positioning seat includes an outer surface having a sliding portion and an engaging slot contiguous to the sliding portion; and
a supporting frame pivotably mounted to the base frame and pivotable between a folding position and an extended position about a pivotal axis, wherein the supporting frame includes a locking seat and a locking member slidably mounted to the locking seat, wherein the locking member remains in contact with the positioning seat, wherein the locking member abuts against the sliding portion when the supporting frame is in the folding position, and wherein the locking member engages with the engaging groove when the supporting frame is in the extended position,
wherein the positioning seat is in a form of a board and is located adjacent to a pivotal connection between the base frame and the supporting frame, wherein the sliding portion and the engaging groove are located on a periphery of the positioning seat opposite to the pivotal connection between the base frame and the supporting frame, wherein the locking seat includes an outer tube, and wherein the locking member is slidable relative to the locking seat in a direction parallel to a radial direction which is perpendicular to the pivotal axis, and
wherein the locking member includes an engaging head at an end thereof adjacent to the positioning seat, wherein the locking member includes a pull handle at another end thereof opposite to the engaging head, wherein the engaging head and the pull handle extend beyond two opposite ends of the outer tube, respectively, wherein a wider portion and a narrower portion are disposed between the engaging head and the pull handle, wherein the narrower portion has a width smaller than a width of the wider portion, wherein the wider portion is adjacent to the engaging head, wherein the narrower portion is adjacent to the pull handle, wherein the locking seat further includes an inner tube, an elastic element, and a stopper, wherein the inner tube is mounted around the locking member and is received in the outer sleeve, wherein the elastic element is mounted around the narrower portion, wherein the stopper is coupled to the outer tube and the inner tube, and wherein the elastic element includes a first end abutting an end face of the wider portion adjacent to the narrower portion and a second end abutting the stopper.

2. The panel cart as claimed in claim 1, wherein the base frame includes a first bottom beam, a first vertical beam, and a first supporting beam, wherein two first casters are mounted to two opposite ends of the first bottom beam, wherein a first end of the first vertical beam is connected to the first bottom beam, wherein an end of the first supporting beam is connected between the first end and a second end of the first vertical beam,
wherein the basis frame further includes a second bottom beam, a second vertical beam, and a second supporting beam, wherein the second bottom beam is parallel to the first bottom beam, wherein two second casters are mounted to two opposite ends of the second bottom beam, wherein the second vertical beam is parallel to the first vertical beam, wherein a first end of the second vertical beam is connected to the second bottom beam, wherein the second vertical beam is parallel to the first vertical beam, wherein an end of the second supporting beam is connected between the first end and a second end of the second vertical beam,
wherein the base frame further includes a first connecting beam and a second connecting beam, wherein the first connecting beam includes a first end connected to the first bottom beam and a second end connected to the second bottom beam, wherein the second connecting beam includes a first end connected to the first vertical beam and a second end connected to the second vertical beam, wherein the positioning seat is mounted to the second vertical beam and is adjacent to the second end of the second vertical beam opposite to the second bottom beam,
wherein the supporting frame includes a first supporting rod, a second supporting rod, and a third supporting rod, wherein the first supporting rod is parallel to the second supporting rod, wherein a pivotal seat is mounted to the first supporting rod and is pivotably connected to the first vertical rod, wherein the locking seat is mounted to the second supporting rod and is pivotably connected to the second vertical beam, wherein two ends of the third supporting rod are connected to an end of the first supporting rod and an end of the second supporting rod, respectively, wherein two brackets are mounted to the third supporting rod, wherein when the supporting frame is in the folding position, the two brackets are adjacent to the first bottom beam and the second bottom beam, and wherein when the supporting frame is in the extended position, the two brackets are elevated, and the first supporting rod and the second supporting rod are in a horizontal position.

3. The panel cart as claimed in claim 2, wherein the supporting frame includes a push handle which is substantially U-shaped, wherein an end of the push handle is slidably received in another end of the first supporting rod opposite to the third supporting rod, and wherein another end of the push handle is slidably received in another end of the second supporting rod opposite to the third supporting rod.

4. The panel cart as claimed in claim 1, wherein the sliding portion is arcuate.

* * * * *